United States Patent [19]
Hurst

[11] 3,900,102
[45] Aug. 19, 1975

[54] WATERPROOFING MEANS AND METHOD

[75] Inventor: John Hurst, London, England

[73] Assignee: W. R. Grace & Co., Cambridge, Mass.

[22] Filed: June 5, 1972

[21] Appl. No.: 259,998

Related U.S. Application Data

[63] Continuation of Ser. No. 2,746, Jan. 14, 1970, abandoned, which is a continuation-in-part of Ser. No. 803,438, Feb. 28, 1969, Pat. No. 3,741,856, which is a continuation-in-part of Ser. No. 676,652, Oct. 19, 1967, abandoned.

[52] U.S. Cl. ............ 206/411; 156/71; 52/419; 52/511; 428/40; 428/189; 428/906
[51] Int. Cl. .................................................. B32b 3/02
[58] Field of Search ........ 161/36, 37, 38, 160, 149, 161/236, 44, 167, 406, 145, 238, 145, 146; 156/71; 52/420, 419, 173, 516

[56] References Cited
UNITED STATES PATENTS

| | | | |
|---|---|---|---|
| 1,361,517 | 12/1920 | Cavey | 161/406 |
| 2,044,788 | 6/1936 | Harshberger | 52/419 |
| 2,847,948 | 8/1958 | Truitt | 161/145 |
| 2,976,256 | 3/1961 | Whittier et al. | 161/237 |
| 3,252,851 | 5/1966 | Benson | 161/236 |
| 3,290,206 | 12/1966 | Johnson et al. | 161/406 |
| 3,292,334 | 12/1966 | Craig | 161/146 |
| 3,486,964 | 12/1969 | Brunlid | 161/145 |

FOREIGN PATENTS OR APPLICATIONS

| | | | |
|---|---|---|---|
| 249,629 | 12/1960 | Australia | 161/236 |
| 1,281,677 | 2/1961 | France | 161/236 |
| 1,317,931 | 1/1962 | France | 161/237 |
| 699,950 | 12/1964 | Canada | 161/236 |

*Primary Examiner*—George F. Lesmes
*Assistant Examiner*—Stanley S. Silverman
*Attorney, Agent, or Firm*—William L. Baker; C. E. Parker

[57] ABSTRACT

Novel structures suitable for the formation of waterproof and/or adhesive layers on surfaces, particularly of concrete, the structures comprising a sheet-like substrate and contiguous thereto a membrane of a water-proofing pressure-sensitive adhesive. The substrate may be a sheet-like support having the membrane adherent thereto or be in the form of a protective coating which can be physically removed from the membrane without substantial damage thereto. If desired, the structures may be in the form of a roll comprising alternate layers of the membrane and sheet-like substrate, one face thereof being substantially more readily physically separable from the membrane than the other face. The structure may have the membrane entending or extensible by cold flow beyond the edge of the sheet-like support and may have a protective sheet which can be used as a means for applying a roll of the structure.

3 Claims, 4 Drawing Figures

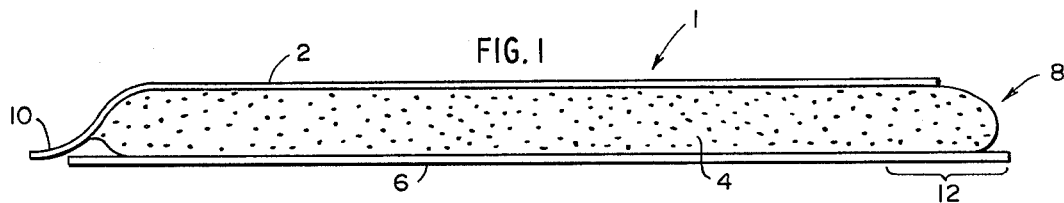
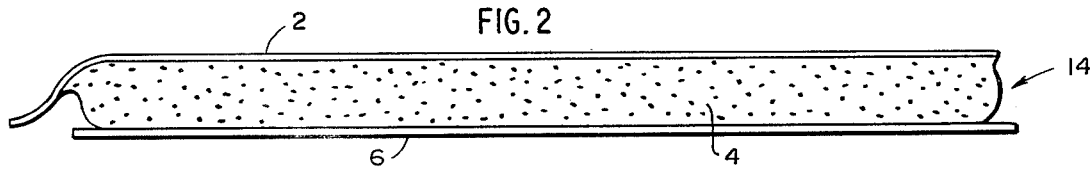
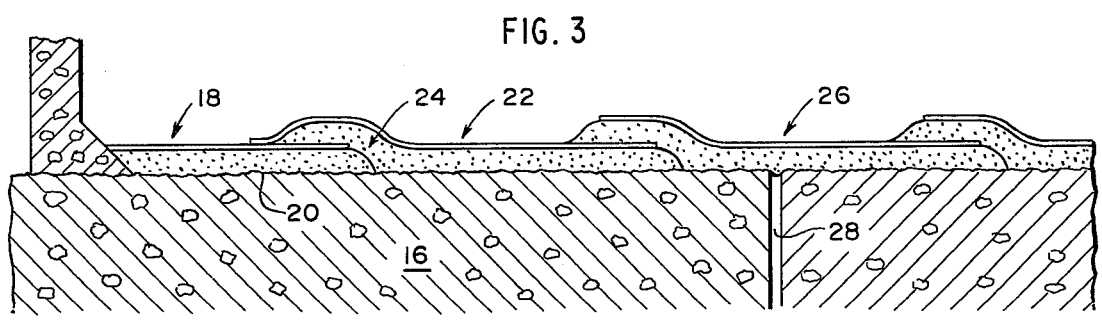
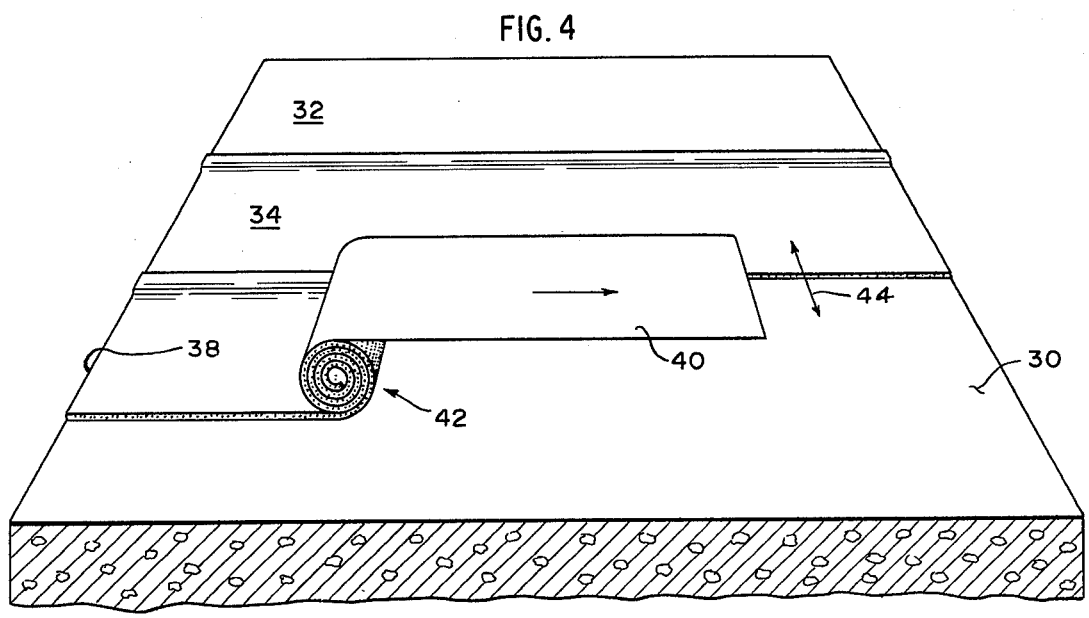
INVENTOR
JOHN HURST
BY
Lawrence L. Cohen
ATTORNEY

WATERPROOFING MEANS AND METHOD

This application is a continuation of Ser. No. 2746, filed Jan. 14, 1970, now abandoned, which is a continuation-in-part of Ser. No. 803,438, filed Feb. 28, 1969, now U.S. Pat. No. 3,741,856, which is a continuation-in-part of application Ser. No. 676,652, filed Oct. 19, 1967, now abandoned.

This invention relates to novel sealants and adhesives in the form of pre-formed sheet-like structures. The novel structures of the invention are particularly useful for application to concrete surfaces and will be described herein chiefly by reference to such use. It is to be understood, however, that the same description applies, *mutatis mutandis*, to the sealing of other surfaces, particularly such as are found in buildings and civil engineering structures.

It is known to seal surfaces, particularly of concrete, by forming thereon a membrane of a bituminous composition or the like which is substantially impermeable to moisture and water vapour. (The term "bituminous composition" is used in this specification to include compositions containing asphalt, tar or pitch.) It is also known that such a composition may form an adhesive for a layer of cladding material, e.g. tiles and panels of linoleum, polyvinyl chloride, thermoplastic material, natural or reconstituted stone or cork, and wood block and wood strip flooring. In the past such membranes have been formed by the application in situ or hot liquid bitumen, tar or pitch or a cold solution or emulsion of bitumen, tar or pitch. If desired, the membrane may be reinforced with latex, asbestos fibers or other types of filler. It is also known to provide a waterproofing membrane by the use of films of polyethylene or synthetic or natural rubber, or of bituminous roofing felt.

These known methods suffer serious disadvantages. Thus in general the known procedures require formation of the layer of sealant in situ with the consequent difficulties in ensuring a uniform layer and the expense of labor at the site. Furthermore, where the surface is a concrete floor which is subject to rising moisture, the adhesive must form a water-impermeable and alkali-resistant membrane; in practice this means that a bituminous composition must be applied hot to the floor, which is highly inconvenient, or a solvent-based bituminous composition must be used, which is expensive and involves fire risk. Generally the adhesive compositions currently in use require, in order to permit evaporation of solvent or aqueous content, to be placed in position some time before the cladding material is applied if a satisfactory bond is to be obtained, and this again is inconvenient.

It is also known to provide the rear surface of cladding materials, particularly floor tiles, with a layer of a contact adhesive covered by a protective sheet which is removed before placing the cladding material in position. However, it is not possible to provide a satisfactory water-and alkali-resistant continuous coating under the cladding material by this means, particularly on a typical rough dusty concrete surface.

It has now been required that considerable advantages are obtained from the use of pre-formed membranes of waterproofing pressure-sensitive adhesives. Such membranes can be produced on a large scale in a factory and then used on site. In one aspect, therefore, the invention provides a novel structure comprising a sheet-like substrate and contiguous thereto a membrane of a waterproofing pressure-sensitive adhesive.

The membrane can be a layer of the adhesive alone or the adhesive can contain reinforcing material, particularly to give the membrane mechanical strength; if desired, the membrane can contain a plurality of layers of waterproofing pressure-sensitive adhesive (the adhesive being the same or different in the different layers), and the layers can be separated by reinforcing material in the form of a sheet.

The novel structures of the invention can be divided into two broad types. The structure of the first type are those designed to provide a continuous waterproof membrane adherent to a surface, the outer surface of the membrane having a non-adhesive surface. The structures of the second type are those designed to provide on a surface a layer of a pressure-sensitive contact adhesive, either over the whole of the surface, thus simultaneously providing a continuous waterproof membrane, or over selected parts of the surface only.

In the structure of the first type, the substrate is a sheet-like support (e.g. a film of an organic polymer such as polyethylene, as explained in detail below) to which the membrane is adherent (that is to say the support and the membrane remain adherent to each other when the structure is used), and the surface of the support remote from the membrane is non-adhesive. In the structure of the second type of the substrate is a protective coating (e.g. siliconized paper or like materials as explained in detail below) which can be physically removed from the membrane without substantial damage to the membrane. It will of course be clear that for storage purposes the surface of the membrane remote from the substrate must have a said protective coating thereon. Thus the novel structures of the invention as produced in the factory, stored and brought to the site are in the form of laminates of the protective coating, the membrane and either a sheet-like support (the first type) or a second protective coating (the second type). The structures are conveniently available in the form of rolls.

It has been realized that in rolls of the structure as produced in the factory, stored and brought to the site, it is possible for the said protective coating on the face of the membrane, which face is to be applied to the surface to be sealed and/or provided with a layer of contact adhesive, to be provided by the substrate itself, if the substrate is such that when the roll of the structure is unrolled, the substrate is physically separated from the said face of the membrane without substantial damage to the membrane. Thus the invention also provides the structure in the form of a roll comprising alternate layers of a membrane of waterproofing pressure-sensitive adhesive and a sheet-like substrate, one face of the substrate being substantially more readily physically separable from the membrane than the other face.

Such rolls can be prepared by forming a substrate, one face of which is substantially more readily separable from the pressure-sensitive adhesive than the other face, preparing a laminate of the substrate and a membrane of the pressure-sensitive adhesive with the said other face contiguous thereto, and rolling up the laminate. The said more readily separable face can be rendered more readily separable before, during or after the lamination with the membrane.

In structures of the first type described above the differential separability of the two faces of the sheet-like support can readily be obtained by forming a release coating on one face only of the support; preferably the release coating is on the outer surface of the rolled-up support. The release coating can be formed in known manner, for example by deposition of a silicon, such as by the application to the membrane of a dispersion of a silicon compound which is cured with the aid of a catalyst and/or heat and forced ventilation.

In structure of the second type, where the substrate is a protective coating which is ultimately removed altogether from the membrane, a release coating is formed on each side of the substrate, e.g. as described above, but coatings with different levels of release properties are of course required in order to obtain the desired differential separability. Preferably the outer face of the rolled-up protective coating is more readily separable from the layer of adhesive than is the inner face of the protective coating.

The widths of the novel structures will vary widely, e.g. from 1 to 48 inches (2.5 to 120 cm.) and even more, depending on the use to which they are to be put; generally they will be at least 2 inches (5 cm.) wide, e.g. 6 to 36 inches (15 to 90 cm.) wide, with widths in the upper part of this range, e.g. 24 to 36 inches (60 to 90 cm.), being preferred where the whole of a surface is to be rendered waterproof. The thickness of the novel structure can also vary widely depending on the intended end use, but will generally be from 0.01 to 0.25 or 0.35 inch (0.025 to 0.6 or 0.9 cm.).

A variety of adhesives can be used successfully for the membrane, but the adhesive must be such that the membrane will stick to the required surface without the use of heat or additional bonding agents; thus for application to surfaces of concrete, which are comparatively rough and dusty, the layer of adhesive must be at least 0.2 inch (0.05 cm.) thick, preferably 0.025 to 0.2 inch (0.063 to 0.5 cm.); the thicker the layer of adhesive, the better the waterproofing effect, but in general a layer 0.025 to 0.15 inch (0.063 to 0.4 cm.) is satisfactory, with thicknesses at the upper end of this range being preferred. Thus for structures of the first type a support having on it a single layer of adhesive 0.09 to 0.13 inch (0.23 to 0.33 cm.) thick is preferred; this may be achieved for example by two layers of adhesive, each 0.04 to 0.07 inch (0.1 to 0.18 cm.) thick, either side of a central reinforcing material.

Bituminous adhesives are generally suitable except where their color is a disadvantage. If a bituminous adhesive is used, it is preferably formed of natural or synthetic rubber, virgin or reclaimed, blended into bitumen to provide a smooth mix. The ratio by weight of bitumen to rubber is suitably greater than 80:20, preferably up to 95:5, especially about 90:10. Other types of contact adhesive composition may include polychloroprene, butyl rubber, oil-based mastics or compositions containing rosins or rosin derivatives. Generally, suitable compositions have softening points (measured by the Ring and Ball method) of 60° to 140°; preferably 60° to 110°C. and penetration values of 50 to 400, preferably 150 to 300 at 25°C. (100 g. 5 secs - I.P. method).

A wide variety of materials can be used to provide protective coatings in the novel structures of the invention. Paper having a release coating thereon, e.g. siliconized paper or suitable material formulated from or with polytetrafluoroethylene, is satisfactory. Other materials include treated or modified films of organic polymers.

A wide variety of materials can be used as the sheet-like support, which forms parts of the novel structures of the first type noted above, and it is a particular advantage of such structures that they can be used to provide a waterproof seal over a surface which combines the properties of the membrane and the support. It is generally desirable that the support should be substantially impermeable to water. For many purposes it is desirable that the support should be such that after application to the surface it is capable of stretching with movement of the concrete or other material, e.g. as a result of shrinkage, with maintenance of a moisture and moisture-vapor-proof seal. To this end it is desirable that the combined structure of the support and the membrane should have, at 20°C., an elongation at break of at least 300% a tensile strength of at least 100 lb. per foot width (at least 1.5 kg. per cm. width) and an Elmendorf tear strength of at least 750 gm. However, where stretchability and flexibility are less important than other properties, supports not fulfilling these requirements can be utilized. For example, it is desirable for some purposes to use a metallic foil, particularly of copper or aluminum, as the support.

The preferred supports are films of natural rubber or of a synthetic organic polymer such as polyethylene, which is preferred, e.g. that commercially available under the trade name Polythene, polypropylene or other polyolefin, a polyamide, a polyester, e.g. polyethylene terephthalate, a polyurethane, polyvinyl chloride, a copolymer of vinyl chloride and vinylidene chloride, a synthetic rubber such as polychloroprene or butyl rubber, regenerated cellulose, cellulose ethers or cellulose esters. Inorganic or metallic supports can also be used.

Particularly for use in road-building it is desirable that the support should be such that hot asphalt can be poured directly onto it without deleterious effect on the waterproof seal. For this purpose the support should be able to resist a temperature of at least 150°C., preferably at least 175°C, for asphalt mixes such as sand course asphalt, and even higher temperatures for hot asphalt (mastic), which is applied at temperatures up to 250°C. A particularly suitable material for this purpose is one consisting of a woven fabric of polypropylene fibers having on one side a waterproof layer of a pressure-sensitive bitumen-rubber adhesive as described above and on the other side a waterproof layer of a bitumen adhesive which is not a pressure-sensitive adhesive when cold but becomes tacky at elevated temperature, as when a hot asphalt mix is poured thereon.

While cellular films can be used as supports, the supports are generally substantially incompressible and have a thickness of at most 0.25 inch (0.6 cm.).

Other sheet-like supports include woven and non-woven fabrics of inorganic or inorganic natural or synthetic fibers (i.e. staple fibers or continuous filaments), e.g. a woven fabric of fibers of one of the synethetic organic polymers already referred to, glass, tissue, hessian, cotton or other fiber scrim or bituminous roofing felt.

If desired, the surface of the support remote from the membrane can be treated to protect it from damage and/or so that it offers an improved keying surface for other material, e.g. concrete, subsequently applied thereto. Thus this surface of the support can be textured and/or can carry a layer of adhesive, which is preferably water-resistant and may be the same as or different from the adhesive in the membrane, to which layer is adherent a deposit of granular or powdered material, e.g. finely divided aggregate or other organic or inorganic material, e.g. sand or cork granules.

As noted above, the novel structures containing a sheet-like support are used to provide a waterproof membrane over a surface, particularly a concrete surface, by applying the exposed face of the membrane to the surface, a plurality of overlapping structures being used if necessary in order to form a continuous membrane over the whole surface. After the structure has thus been applied it is usual to form or place another surface adjacent thereto, e.g. another mass of concrete, a sand or cement screed or other floor finish, a layer of asphalt or a cladding material.

Also as noted above, the preferred membranes having protective coatings on both faces thereof are particularly valuable for the easy and expeditious securing of cladding materials to surfaces, particularly concrete. Accordingly in another aspect this invention provides a process for securing cladding material to a surface which comprises (a) removing the protective coating from one face of the pre-formed membrane, (b) applying the thus-exposed face of the membrane to the surface, (c) removing the protective coating from the other surface of the membrane and (d) applying the cladding material to the said other face of the membrane.

While the above process is of most value in cladding of floors, it is equally applicable to the cladding of walls and ceilings. The nature of the cladding material is not critical and any of the cladding materials mentioned hereinbefore, and also ceiling tiles, e.g. of polystyrene, may be used.

The novel structures of the invention can be prepared without difficulty by techniques known per se. It is preferred to use adhesives which are not solvent-based and are thus applied hot. Thus the adhesive may be applied hot, with aid of a suitable device to ensure a uniform layer, to the substrate. If it is desired to incorporate a sheet-like reinforcing layer in the membrane, this can be achieved, for example by pressing a scrim into the layer of adhesive. Such a reinforcing layer is not generally required when a support is used, but is often helpful when there is no support, in order to prevent excessive distortion of the membrane when the protective coatings are removed.

The novel structures can be used in accordance with the invention by applying an exposed face of the membrane to the surface to be sealed and/or provided with a layer of contact adhesive; in the latter case the protective coating is removed at an appropriate stage to expose the other surface of the membrane ready for the application thereto of cladding material. If necessary the formation of a continuous waterproof seal over the whole surface is achieved by further applications so that each membrane overlaps its neighbor.

When the rolls are used, they are simply unrolled, thus exposing one surface of the membrane, which surface is applied to the surface to be sealed and/or provided with a layer of contact adhesive; in the latter case the protective coating is removed at an appropriate stage to expose the other surface of the membrane ready for the application thereto of cladding material. If necessary the formation of a continuous waterproof seal over the whole surface is achieved by further applications so that each membrane overlaps its neighbor.

The following example illustrate the invention.

EXAMPLE 1

A structure according to the invention was made by coating each face of film of polyrethylene (Polythene) 12 inches (30 cm.) wide and 0.005 inch (0.013 cm.) thick with a coating 0.125 inch (0.3 cm.) thick of a bituminous adhesive consisting of 7 parts by weight natural rubber and 93 parts by weight oxidized bitumen, and depositing finely divided silica sand on one of the coatings. The structure was placed over a concrete floor base with the face having the silica sand deposit thereon uppermost and a concrete floor screed of sand and cement was then applied. A moisture and moisture-vapor proof seal between the floor base and screed was thus obtained.

EXAMPLE 2

A second structure was made by coating one face of a polyethylene film as used in Example 1 with a coating 0.125 inch (0.3 cm.) thick of the bituminous adhesive used in Example 1.

One such structure was placed over a concrete floor base with the adhesive-coated face adjacent to the concrete; a floor screed of sand and cement was then applied. A moisture and moisture-vapor-proof seal between the floor base and screed was thus obtained.

A second such structure was placed over a concrete roof, with the adhesive-coated face adjacent to the concrete. Earth was then filled in over the roof. A moisture and moisture-vapor-proof seal between the roof and the earth was thus obtained.

In another particularly preferred embodiment of the invention as heretofore described, critical benefits are seen in its performance in the construction industry as a waterproofing, dampproofing and/or vapor barrier member. In the construction industry it is sometimes said that these functions fall within the critical 1% of construction costs. That is, while they represent only 1% of construction costs, reliable performance is imperative and failure is intolerable. Of course the severity of the requirement and the penalty for failure depend on the circumstances. Nevertheless, waterproofing, dampproofing and vapor barrier have, in failure, been the result of great loss and expense and are the subject of considerable concern in the industry. A variety of materials, methods and specifications have been suggested, although they frequently derive one from the other or merely involve increasing the volume usage of known means.

Waterproofing and dampproofing largely differ only as a matter of degree while vapor barrier is, by nature, somewhat different in kind; the two categories having therefore found somewhat differing treatment in the industry. Hereafter in this disclosure, however, the invention may be described as related to waterproof or waterproofing but it should be understood that such description also comprehends dampproofing and vapor barrier which universal capability is one of the advantages of the invention.

Waterproofing and dampproofing are commonplace problems in the construction industry and are problems that are demanding greater attention in all segments of the industry in response to changing construction techniques, architectural changes and increasing costs of material and labor. The requirement for waterproofing generally relates to protection against substantial accumulations of free or running water or water under pressure and can generally be appreciated by the following exemplary applications:

Above-grade installations within or integral to buildings. Typical installations include spandrel covers, through-wall installations over windows and doors, protection beneath shower, toilet and kitchen floors and protection for such areas as entrance canopies and stairwells;

Above or on-grade installations close to or associated with the building. These include terraces, plazas, malls, planters, swimming pools, moats, sidewalks and above-ground parking areas;

Below grade installations such as basement doors and walls, lower level parking garages, elevator pits, underground mechanical rooms, underground pipes and personnel or mechanical tunnels.

Of course these categories could be more inclusively described or expanded; one has but to observe the great variety of current construction trends and architecture. By further example applications may be disassociated from building construction per se, e.g. reservoirs, traffic tunnels, bridges and parking structures.

Dampproofing installations are common to a number of waterproofing installations the basic difference being the amount of water anticipated. Dampproofing applications are those where some external moisture is expected but there is little likelihood of measurable water pressure or need to contain water passing from inside or above the structure. Principal damp-proofing applications are in subfloor areas well above water table or beneath on-grade slabs where flooding is not a problem.

Of the several types of waterproofing materials and methods used in the past, probably the most common is the hot mopping of asphalt with alternate layers of roofing felts, glass cloth or open weave cotton. This is a relatively difficult application being messy and unpleasant work and involving dangerous fumes, heat and fire hazard. Increasing labor costs have made this method less attractive and some workers have objected or refused to do it. The hot mopping method is also disadvantageous because the hot bitumen will frequently cool and stiffen before the felt or cloth can be applied. It frequently occurs that where a length of material is applied improperly it cannot be corrected due to cooling of the bitumen. Experience indicates that only constant and rigorous supervision prevents improper installation and even so, a good job is difficult to obtain. For example it is important that the hot liquid asphalt be mopped on smoothly and in uniform thickness because failure to do so can result in the formation of channels or cavities where water can flow or collect and further, lack of uniformity creates weakness and stress concentrations which frequently result in splitting open the membrane which become embrittled in cold weather.

Cold applied sheet rubber or plastic have also been used by adhering them just at the edges or across the entire area. However, such sheets are very heavy and expensive and must be sealed at the edges. They also require the application of a hot-mopped layer of asphalt. The same difficulties as mentioned above apply regarding the problems of applying the hot liquid and the incipient failures commonly connected with it.

Vapor barrier characteristics are measured in terms of moisture vapor transmission rate (MVTR) and is a mechanism considerably different than water or dampproofing.

The difficulty in the past in providing long lasting waterproofing, dampproofing and vapor barrier has not been simply in finding materials that will stop the passage of water, etc. The problem is rather in providing materials in such form and with methods and means by which they can be economically and uniformly applied over large areas so as to give assurance of integrity initially and over long periods without the need for excessive care or skill or by the expedient of massive applications of material.

The article of the present preferred embodiment is a novel combination which is economically and uniformly preformed, easy to bring to the cite, simple to install and is self protective and self healing against accodental damage or failure on its surface or at edges, joints or overlaps either during installation or thereafter. It is preformed at a location remote from the construction site, brought to the site preferably in the form of a roll and laid on a surface in overlapping strips. It will provide waterproofing, dampproofing and vapor barrier characteristics equal to or better then most known materials. Most importantly, as an integrated part of a construction it can give superior assurance of performance after completion of the installation and is resistant to damage during installation.

The article is generally derived from the aforedescribed structure of the first type certain aspects of which are now reiterated or expanded upon. It includes a flexible support sheet or film, e.g. polyethylene, which for most installations should be elongated, that is in the form of a wide strip. Adherent to and coextensive with one surface of the sheet is a waterproof and waterproofing membrane preferably formulated of a bituminous rubber composition. The membrane is soft, and flexible in addition to its adhesive properties. It is substantially thicker than the support sheet and has the ability to reconsolidate or self seal and will cold flow when placed under pressure where it is not confined by the support sheet. In one form of the present preferred embodiment the membrane is preformed to extend somewhat beyond the edges of the support sheet. In another form, it is permissible for the membrane to extend at least up to the edges of the support sheet where, however, it is caused to flow outwardly from the support sheet after application as will be seen from the subsequent discussion. It is also permissible that only one of the long and short edges be so treated. Hereafter only the long edge will be referred to and it should be understood that the discussion also applies to the short edges of the strips as well.

Until the structure is applied the surface of the membrane remote from the support is preferably covered by a protective sheet which is, or is treated to be, readily releasable from the membrane without damage thereto, e.g. siliconized paper. Where the structure is applied to a construction substrate by unrolling it, this protective sheet is especially advantageous in providing a means for unrolling the structure and controlling its direction of movement over the substrate to be covered.

FIG. 1 shows in cross section the article 1 in which a support sheet 2 has adherent thereto a membrane 4 on which is a releasable protective sheet 6. The membrane extends beyond one edge of the support sheet at 8 in accordance with the present preferred embodiment. At 10 the membrane is recessed from the edge of the support sheet. The protective sheet 6 extends slightly beyond at least the edges of the membrane.

Stripes of the structure have a nominal width of from 24–48 inches preferably on the order of 36 inches. The stripes should be as long as possible having due consideration for shipping, handling and the size of particular installations.

The support sheet possesses good vapor barrier and waterproofing characteristics and is preferably a polymeric film material. Polyethylene film 5–20 mils, prefereably 10 mils thick, works very well in the combination having the functional, strength and flexibility characteristics necessary for the result desired.

The preferred bituminous rubber composition is formed of natural or synthetic rubber, virgin or reclaimed, blended into bitumen to a smooth mixture. The ratio of bitumen to rubber is suitably from 75:25 or more, the desired characteristics having been set out earlier in this disclosure.

The protective layer is preferably a siliconized paper or the like which will release easily from the membrane. The protective layer extends in width at least over the whole width of the membrane and preferably somewhat beyond.

Where, in one embodiment the structure is preformed into a roll, the surface of the protective layer which is remote from the membrane is provided with the release means along its lengthwise margin or margins corresponding to the portion of the membrane which extends beyond the support sheet as at 12 in FIG. 1. For example a siliconized treatment may be marginally so applied. By this means the structure may be formed into a roll and then unrolled without damaging the membrane because the releasible margin contacts the portion of the membrane extending beyond the support sheet upon rolling.

Within the range of rubber-bitumen mixtures and as they may be modified by additives, fillers, etc., the membrane will remain flexible, soft and pliable, be cold-flowable under pressure, somewhat elastic and resilient to a greater or lesser extent, dependent on the particular formulation; one of the advantages of the invention being the substantial insensitivity of these features to such wide temperature ranges that construction can proceed at times where in the past it could not without great difficulty. This temperature insensitivity is also advantageous in enabling continuing waterproofing performance over long periods.

Where the membrane is formulated as described it has sufficient ability to cold-flow so that as mentioned above, it need only extend in width up to the edge of the support sheet as in FIG. 2 at 14 where, upon installation, pressure will be applied to cause flow of the membrane outwardly of the support sheet giving the same effect as when it is so performed.

When installed in relation to particular construction elements as on a construction substrate such as concrete, the strips will laminate to the substrate and will form a continuous membrane which does not contain and is not succeptible to the formation of channels for the flow or collection of water and is highly resistant to damage during installation and failure thereafter. During such installation the structure may be walked on and will not displace due to wind or foot traffic. Any channels or spaces which do occur can be easily corrected by pressing on the structure or they may correct themselves.

As shown in FIG. 3 the structures are installed on a concrete construction member 16 in ovelapping fashion. The first strip 18 is laid flat, the membrane 20 adhering to the rough dusty concrete surface. The second strip is overlapped a substantial amount on the first. At the point of overlap 24 a membrane-to-membrane contact is achieved due to the extension of the membrane of strip 12 beyond the support sheet 16. Strip 22 is shown in the embodiment of FIG. 1 where only the edge to be underlapped has the extended portion of membrane. The other edge has the membrane recessed. This provides for protection during installation. Strip 26 is a version in which both edges have the extended membrane portion. An expansion joint in the concrete is shown at 28. The strips may be conceived up in FIG. 2 as having been preformed with the membrane extending only up to the edge of the support strip at the underlapped edge. Upon installation in such case, pressure is applied along the overlap, e.g. by rolling with a weight to cause the membrane to cold flow outwardly into membrane-to-membrane contact, forming a continuous membrane from the individual strips. In fact it is preferable to press all overlaps to eliminate any bridging and assure a good joinder of the membranes. Extension of the membrane beyond the support may be up to ½ inch and is preferably between about 1/16 - 3/16 inch, ⅛ inch being especially preferred. The thickness of the membrane was defined above and is most effective in the range of 0.025 to 0.15, particularly in the range of about 0.035 in. to about 0.095 in.

The structure and method described is especially advantageous in combination with certain increasingly common types of construction. One such type is the split-slab construction used in plazas, malls, parking decks and the like which may be on or above grade and frequently is over an occupied area or otherwise in which waterproofing from above is necessary. This type of construction is also known as granolithic as distinguished from monolithic construction. The split slab construction has a lower slab or base course or deck, typically concrete which is usually left in a rough finished condition, i.e. may be wood float finished but not steel trowelled. A topping slab or wearing course is applied over the lower slab and is, for example concrete, asphalt, or a mortar setting bed in which brick, tile or stone may be set. The waterproofing structure is applied between the slabs. The structure herein described is especially useful in such construction because the weight of the topping slab operates with the waterproofing structure to insure its integrity. That is, it presses on the sheet and membrane assuring intimate contact of the membrane to the base and to the adjacent membrane of the overlapping strips. The pressure activates the ability to reconsolidate and self heal as well as closing any cavities. Split-slab construction frequently requires in addition to waterproofing, bondbreaking, that is the absence of a bond between the slabs so as to permit relative movement of the slabs. By the use of the present structure the support sheet provides the bondbreaking action without disturbing the membrane while the membrane protects the sheet from puncture and tearing.

In another application the structure is applied beneath on-grade slabs. In this case it is also advantageous to leave the protective layer on as there is no requirement to bond the grade. The members of the structure thus contribute to self-protection as well as waterproofing.

The structure may be applied across construction and expansion joints and will remain effective during cycling of such joints.

As explained above the present structure is self protective and self healing in the ability of the bituminous rubber composition to reconsolidate and also due to its ability to cold flow. Thus if the support sheet is punctured or torn for example by accident during application, the membrane can seal the puncture or tear. This effect is even more pronounced if a top coating is placed over the structure or if pressure is otherwise applied. This feature as well as the adhesive property is maintained to quite low temperatures so that the structure can be applied at low temperatures on the order of 40°F and will remain soft and integral even during movement of adjacent construction elements. The combined action of the support sheet and the membrane not only permits the self healing result but also avoids bridging over gaps and irregularities and also permits shaping of the structure around drain, pans and small areas as planters, etc. Remarkably however, the membrane will not cold flow under pressure except at free edges or at small points of pressure. Moreover when pressure is released for example from a dropped tool or footstep the structure will recover completely or nearly so and much more rapidly than will the membrane alone. The bituminous rubber composition membrane in combination with polyethylene support sheet is an excellent example of a structure giving this behavior.

The strips are most conveniently and advantageously applied on substantially horizontal surfaces where the term horizontal should be taken to mean as differentiated from very steep slopes or vertical surfaces. In the latter cases the overlapping strips may need to be backfilled or overlayed quickly to prevent disruption. If, however, the strips are hung vertically (as distinguished from parallel with the grade) and secured at the top then such precautions are unnecessary, although the force of the backfill or overlayer has the same beneficial effect as the topping slab discussed above in relation to split slab construction.

FIG. 4 shows a roll of the waterproofing structure being applied. The substrate 30 has already been covered with strips 32 and 34. The strip 36, in the form of a roll is set at the starting end 38, of a desired path of application. The protective sheet 40 is stripped back a small amount and the thus exposed membrane is adhered to the substrate at the starting end 38. The protective sheet 40 is then pulled as evenly as possible in the direction of application, that is the desired path. The structure will unroll as the protective sheet is stripped off. About half the periphery of the roll consists of exposed but free membrane as at 42 which allows a degree of adjustment in the direction of the roll. Such adjustment can be made by moving or merely applying force on the sheet 38 as at 44, or by actually pushing one side of the roll 36.

The following non limiting examples illustrate the invention:

EXAMPLE 3

A rough finished concrete tub approximately 36 inches square and 6 inches deep was prepared. Several ½ inch holes were formed in the tub. The tub was lined with a structure of the invention having a 10 mil polyethylene support sheet and a membrane about 0.06 of an inch thick.

Three strips of the structure were used resulting in two overlaps. The membrane extended beyond the edges of the support sheet from about ⅛ to ¼ inch. The overlap distance was 2½ to 3 inches. The overlaps were positioned to overlay the holes in the concrete pools. The overlapped area was pressed with a wallpaper roller. After 24 hours with six inches of water, no leaks were detected under the pool.

EXAMPLE 4

Example 3 was repeated except that the overlap distance was ½ inch to 1 inch. Once again, no leaks were detected.

EXAMPLE 5

The structure of Example 3 and 4 were arranged in a bowl shape and filled with water. A roofing nail and a nail of about 150 inch diameter were pushed into the structure. There was no leak. Both nails were pulled out. Under the longer nail a single drop of water only appeared at the time of extraction. No further leakage was present at either hole.

EXAMPLE 6

In early spring and through the summer in San Antonio, Texas 60,000 square feet of the structure and overlap of Example 3 were applied in a split slab construction in which the substrate was a concrete structural slab and the topping course was a mortar settling bed in which stone was set. Underneath were offices and record storage. No leaks have been reported.

EXAMPLE 7

In Toronto, Canada in December through March approximately 9,000 square feet of the structure and overlap of Example 30were supplied to concrete substrate. The application was divided roughly between 8,000 square feet horizontally and 1,000 square feet vertically. Concrete was laid on top, the construction being a reservoir for an air conditioning system. No leaks have been detected.

While the invention has been described in connection with certain now preferred embodiments, it will be understood that many variations and modifications may occur to those skilled in the art after benefiting from the present teaching without departing from the spirit and scope of this invention as defined in the appended claims.

What is claimed is:

1. A preformed, flexible sheet-like structure suitable for application to concrete as a waterproofing structure, said structure being in the form of a roll alternate layers of (a) a flexible support sheet comprised of a synthetic organic polymer selected from the group consisting of polyolefin and polyvinyl chloride; (b) a waterproof and waterproofing flexible pressure-sensitive adhesive membrane adhered to one face of said support sheet, said adhesive membrane being at least 0.025 cm thick and of a self-healing bitumen-rubber composition wherein the ratio by weight of said bitumen to said rubber is at least 75:25, an edge of said membrane along at least one of the edges of said support sheet extending effectively beyond the edge of said support sheet so that unrolling and overlapping of the preformed structure results in a continuous membrane-to-membrane cohesive contact at the point where the support sheet of the overlapped structure ends; and (c) a protective siliconized paper sheet adherent to and readily releasable from the surface of said adhesive membrane remote from said support sheet and also readily releasable from the membrane on a margin on its face remote from the membrane, which margin corresponds to the portion of the adhesive membrane extending beyond the edge of the support sheet so that the structure may be unrolled without damage.

2. The structure of claim 1 wherein said organic polymer is a polyolefin.

3. The structure of claim 1 wherein the roll is formed so that the protective sheet is on the outside.

* * * * *